(12) United States Patent
Baker et al.

(10) Patent No.: US 9,225,796 B2
(45) Date of Patent: Dec. 29, 2015

(54) BINDING AN APPLIANCE TO A NETWORK AT POINT OF PURCHASE

(71) Applicant: General Electric Company, Schenectady, NY (US)

(72) Inventors: Christopher Matthew Baker, Louisville, KY (US); William Jerome Burke, Louisville, KY (US)

(73) Assignee: General Electric Company, Schenectady, NY (US)

(*) Notice: Subject to any disclaimer, the term of this patent is extended or adjusted under 35 U.S.C. 154(b) by 316 days.

(21) Appl. No.: 13/718,185

(22) Filed: Dec. 18, 2012

(65) Prior Publication Data

US 2014/0173049 A1     Jun. 19, 2014

(51) Int. Cl.
*H04L 12/28* (2006.01)
*H04L 29/08* (2006.01)
*H04L 12/24* (2006.01)

(52) U.S. Cl.
CPC ............ *H04L 67/34* (2013.01); *H04L 12/2424* (2013.01); *H04L 12/2803* (2013.01); *H04L 12/2809* (2013.01); *H04L 29/08567* (2013.01); *H04L 29/08648* (2013.01); *H04L 67/30* (2013.01)

(58) Field of Classification Search
CPC .................. H04L 29/08567; H04L 29/08648; H04L 12/2809; H04L 12/2803; H04L 12/2424
USPC ............... 709/224, 217; 705/27, 44; 717/170; 726/12; 370/401; 700/291, 276; 706/12
See application file for complete search history.

(56) References Cited

U.S. PATENT DOCUMENTS

| | | | |
|---|---|---|---|
| 2003/0105679 A1* | 6/2003 | Krishnan et al. | 705/27 |
| 2004/0059817 A1* | 3/2004 | Ueno et al. | 709/224 |
| 2009/0235244 A1* | 9/2009 | Enomori et al. | 717/170 |
| 2010/0071053 A1* | 3/2010 | Ansari et al. | 726/12 |
| 2010/0166004 A1* | 7/2010 | Wang et al. | 370/401 |
| 2011/0046805 A1* | 2/2011 | Bedros et al. | 700/291 |
| 2012/0109384 A1 | 5/2012 | Stephanian | |
| 2013/0013506 A1* | 1/2013 | Wiggins et al. | 705/44 |
| 2013/0311610 A1* | 11/2013 | Kim et al. | 709/217 |
| 2014/0032449 A1* | 1/2014 | Kacin et al. | 706/12 |
| 2014/0052300 A1* | 2/2014 | Matsuoka et al. | 700/276 |

\* cited by examiner

*Primary Examiner* — Le H Luu
(74) *Attorney, Agent, or Firm* — Dority & Manning, P.A.

(57) ABSTRACT

A system and method of remotely binding appliance information to a user's network is provided. At a point-of-purchase, a terminal can communicate with a remote server over a network, such as the Internet, to provide appliance identification information to the server. The server can associate the identified appliance with user data associated with the user purchasing the appliance. The server can also identify appliance data stored at the server based on the appliance identification information. The server can then bind the appliance data to the user's network. For instance, a target object, such as a local computing device (e.g. a home energy manager or local network device such as a network terminal), associated with the user can be identified based on the user data and a path to provide the appliance data to the target object can be specified.

12 Claims, 3 Drawing Sheets

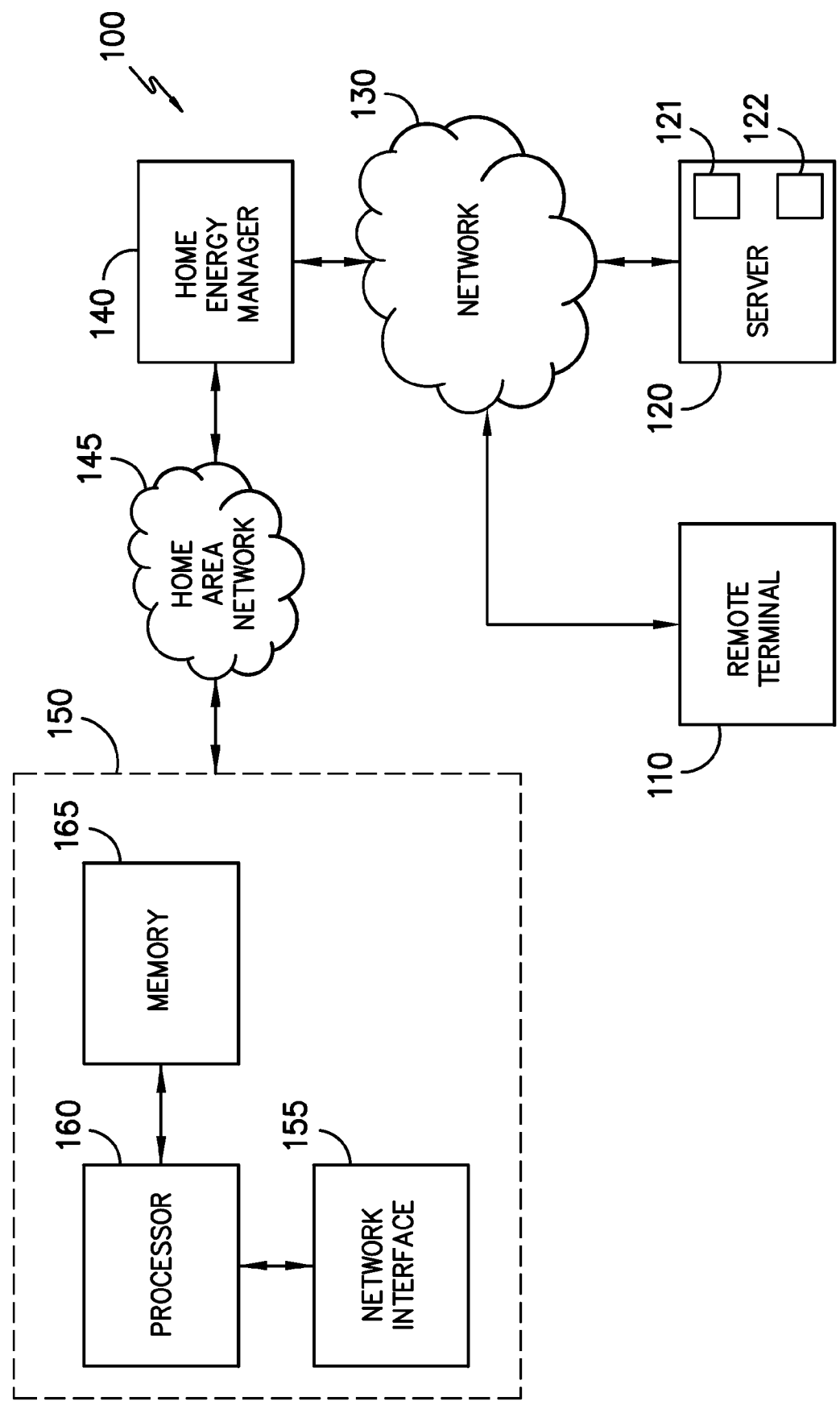
FIG. -1-

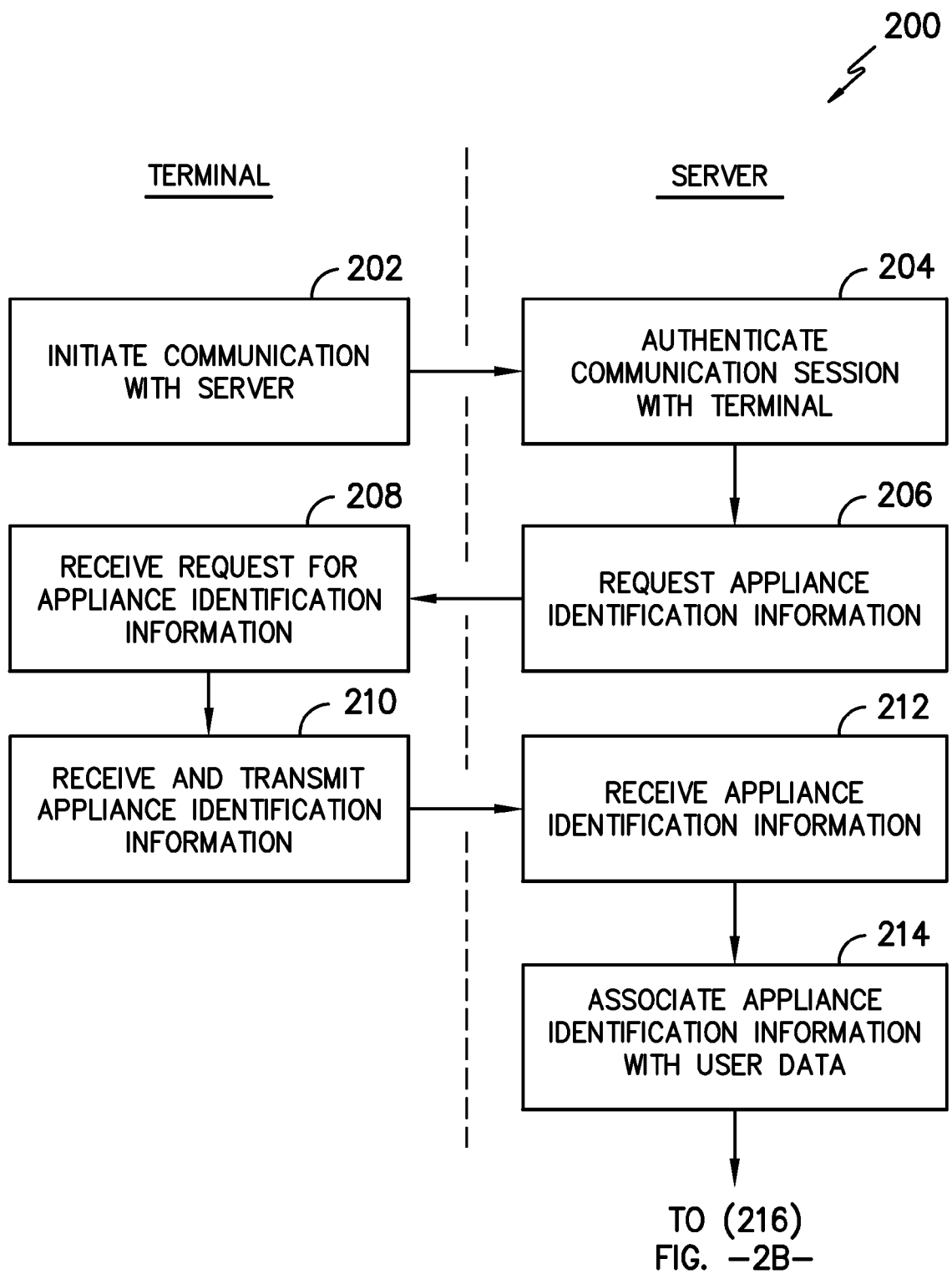
FIG. −2A−

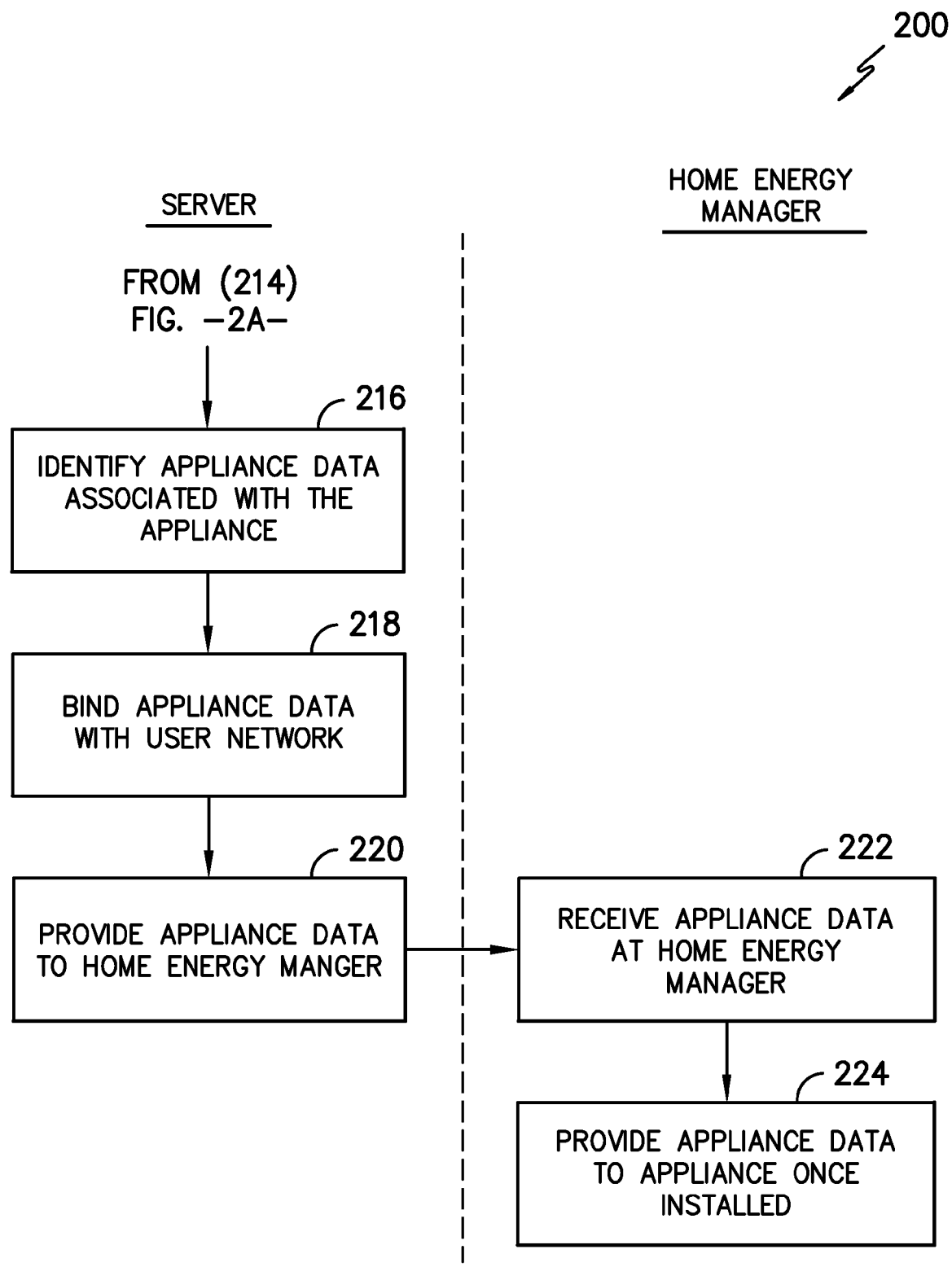
FIG. —2B—

BINDING AN APPLIANCE TO A NETWORK AT POINT OF PURCHASE

FIELD OF THE INVENTION

The present disclosure relates to networked appliances and more particularly to binding appliance information to the network before installing the appliance at a premises.

BACKGROUND OF THE INVENTION

Several appliances can be installed on a single premises such as a residential home, an office building, or a commercial establishment. For instance, a refrigerator, a microwave oven, a cooking appliance having a stove and/or oven, heating and/or cooling systems can be installed. Modern appliances are more sophisticated than their earlier counterparts, and often include microcontrollers or microprocessors that allow a user greater interaction with the appliance. For example, an appliance can be programmed or reprogramed as well as provide diagnostic information.

The Internet has given rise to worldwide connectivity for many types of devices. Appliances have traditionally had only standalone capabilities which required operation without cooperation or communication between other devices. However, recently, network adapters have been added to appliances to allow the appliances to connect to a remote device over a network. Cloud-like computing structures have been employed such that a user's data, software, and information associated with the appliance can be stored at the remote server. However, binding the information associated with the appliance with the user's network is complex and difficult for certain consumers to successfully achieve.

Thus, a need exists for a system and method for facilitating the binding of information associated with an appliance with a user's network by initiating, at a point of sale of the appliance, binding of the appliance information with the user.

BRIEF DESCRIPTION OF THE INVENTION

Aspects and advantages of the invention will be set forth in part in the following description, or may be apparent from the description, or may be learned through practice of the invention.

One exemplary aspect of the present disclosure is directed to receiving, at a server, appliance identification information entered at a terminal. The terminal is located at a point of purchase for the appliance. The method further includes identifying appliance data stored at the server based on the appliance identification information. The method further includes binding the appliance data to a remote device located at a premises where the appliance is to be installed.

Other exemplary aspects of the present disclosure are directed to are directed to systems, apparatus, computer-readable media, devices, and user interfaces for binding appliance data to a network associated with a user purchasing the appliance at a point of purchase for the appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts a block diagram of a system for binding appliance information to a user's network according to an exemplary embodiment of the present disclosure; and FIGS. 2A and 2B depict a flow chart of an exemplary method according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure relates to a system and method of remotely binding appliance information to a user's network. At a point-of-purchase, a terminal can communicate with a remote server over a network, such as the Internet, to provide appliance identification information to the server. The server can associate the identified appliance with user data associated with the user purchasing the appliance. The server can also identify appliance data stored at the server based on the appliance identification information. This data stored at the server can include software, firmware, software and/or firmware updates, database information, operation information, user guide information and other suitable information. The server can then bind the appliance data to the user's network. For instance, a target object, such as a local computing device (e.g. a home energy manager or local network device such as a network terminal), associated with the user can be identified based on the user data and a path to provide the appliance data to the target object can be specified.

The server can then transmit the information associated with the appliance to the local computing device located at the premises at which the appliance will be installed. The appliance data can then be downloaded from the local computing device (e.g. home energy manager) to the appliance after the appliance is installed at the premises. In this manner, a consumer can initiate binding of appliance data with the user's network at a point of purchase of the appliance, facilitating installation and configuration of the appliance.

FIG. 1 depicts a block diagram of an appliance system 100 according to an exemplary embodiment of the present disclosure. System 100 can include a point of purchase terminal 110, a server 120, a network 130, a home energy manager 140, a home area network 145, and an appliance 150. Due to the inherent flexibility of computer-based systems, one of ordinary skill in the art, in light of the disclosures contained herein, will understand that a great variety of possible configurations, combinations, and divisions of tasks and functionality between and among the components of a system 100 are possible. For instance, aspects of the systems and methods disclosed herein can be implemented using a single computing device or across multiple computing devices.

Terminal 110 can be located at a point of purchase of an appliance. For instance, the terminal 110 can be installed or located at a retailer location. The terminal 110 can be any suitable computing device and can include a memory, processor, display, network interface, and input device. For instance, the terminal 110 can be a desktop, laptop, mobile device, tablet, or other suitable computing device. The terminal 110 can be configured to communicate with server 120 over network 130.

The network 130 can be any type of communication network. For instance, network 130 can include one or more of a wireless network, a wired network, a personal area network, a local area network, a wide area network, the Internet, etc.

Server 120 can be configured as a cloud-like device for storage of appliance data and user data. The server 120 can include a memory 121 and a processor 122. By way of example, any/all of the memory or processing devices can include microprocessors, CPUs or the like, such as general or special purpose microprocessors operable to execute programming instructions or micro-control code associated with operation of an appliance. The memory may represent random access memory such as DRAM, or read only memory such as ROM or FLASH. In one embodiment, the processor executes programming instructions stored in memory. The memory may be a separate component from the processor or may be included onboard within the processor. Alternatively, the controller might also be constructed without using a microprocessor, using a combination of discrete analog and/or digital logic circuitry (such as amplifiers, integrators, comparators, flip-flops, AND gates, and the like) to perform appliance control functionality instead of relying upon software.

The server can store appliance data associated with various appliances. The appliance data can include any information associated with an appliance such as software, firmware, software and/or firmware updates, database information, operation information, user guide information, etc. The server can also store user data optionally provided by a user purchasing the appliance. The user data can include the identity of a local computing device (e.g. home energy manager 140 or local network device) installed at a premises associated with the user as well as other user information, such as the identity of other appliances connected with the user's home area network.

Home energy manager 140 can communicate with server 120 via network 130. Home energy manager 140 can be any computing device having a processor and a memory that oversees communication within a home area network 145 from a single interface. The home energy manager 140 can be connected to appliance 150 and/or a plurality of home devices.

Home area network 145 can be any type of network that allows at least one appliance to communicate with another device, such as home energy manager 140. The home area network 145 can include any combination of wired, wireless, or other network links. While only a single appliance 150 is illustrated in FIG. 1 as being coupled to the home area network 145, any number of appliances within a single premises can be coupled to the network 145.

Appliance 150 can be any appliance coupled to a network. For instance, appliance 150 can include a refrigerator, a washer, a clothes dryer, an oven, a cooktop, a range, a microwave, and/or a HVAC system. Those of ordinary skill in the art, using the disclosures provided herein, will understand that the subject matter of the present disclosure encompasses any suitable type of appliance.

According to aspects of the present disclosure, terminal 110 can initiate communications with the server 120 over network 130. More particularly, after a user purchases an appliance, terminal 110 can be accessed by the user or person assisting the user (e.g. a retail associate). For instance, a web page hosted by the server 120 can be presented on a display associated with the terminal 110. The server 120 can request authentication information such a user name and password, so that the user can log in to the user's account. After authentication is complete, the server 120 can request appliance identification information. The appliance identification information can be any type of information used to identify the specific appliance purchased by the user. The user or person assisting the user can then input the requested identification information. The appliance identification information can be any suitable information identifying the specific appliance, such as a serial number or bar code information.

The server 120 receives the appliance identification information and associates the information with user data stored at the server 120. The user data can include the identity of a local computing device (e.g. home energy manager 140, network device, or other device) installed at a premises associated with the user as well as other user information. The user data can be previously stored at the server 120 or provided to the server 120 by the user or person assisting the user via the terminal 110.

The server 120 can identify appliance data associated with the identified appliance. The appliance data can include software, firmware, software and/or firmware updates, database information, operation information, user guide information or any other information associated with the appliance. The server 120 can then bind the appliance data with the user's network.

Binding the appliance data with the user's network can include identifying a target object of the appliance information (e.g. home energy manager 140) and identifying a in memory of the appliance data at the server 120. A path to bind the source of the appliance data at the server 120 with the target object can be provided, such as by a data write to a uniform resource indicator (URI) in a URI tree.

After the server 120 binds the appliance data with the user's network, the server 120 can send a message to the home energy manager 140 indicative of an indication that an appliance has been purchased and will be installed and connected over the home area network 145. Alternatively, the home energy manager 140 can make periodic inquiries to determine whether a new appliance has been identified.

Once the path between a source of the appliance data and the home energy manager 140 has been specified, the server 120 can transmit the information associated with the appliance to the home energy manager 140. When the appliance 150 is connected to the home area network 145 via network interface 155 after installation, the processor 160 and memory 165 can download the appliance data from the home energy manager 140.

FIGS. 2A and 2B depict a flow chart of an exemplary method 200 according to an exemplary embodiment of the present disclosure. The method 200 can be implemented across any suitable appliance system, such as the system depicted in FIG. 1. In addition, although FIGS. 2A and 2B depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (202), a terminal located at a point of purchase can initiate communication with a server. For instance, a user or a person assisting a user can initiate communication with a server at a point of purchase terminal after purchase of an appliance. The server can authenticate the communication session with the terminal at (204) using any known authentication techniques such as user mane/password authentication. The server then requests appliance identification information at (206).

After receiving the request for appliance identification information at (208), the appliance identification information can be input at the remote terminal and transmitted to the server at (210). The appliance identification information can be any suitable information for identifying the purchased appliance. For instance, the appliance identification information can include a serial number or bar code information.

Once the appliance identification information is received at the server (212), the server can associate the appliance identification information with user data (214). User data can include user information associated with a user and a user's home area network, such as the identity, location, IP address, and other information of a local computing device (e.g. a home energy manager) associated with the user.

The server can also identify appliance data stored at the server based on the appliance identification information provided from the terminal (216). The appliance data can include can include software, firmware, software and/or firmware updates, database information, operation information, user guide information or any other information associated with the appliance.

At (218), the server binds the appliance information stored at the server with the user's network. In particular, a target object of the appliance information (e.g.) home energy manager can be identified as well as a source of the appliance data at the server 120. A path to bind the source of the appliance data at the server 120 with the target object can then be provided, such as by a data write to a uniform resource indicator (URI) in a URI tree.

At (220), the server can provide appliance data to the home energy manager located at the user's premises. For instance, the appliance data can be provided over a network from the server to the home energy manager via the data path specified while binding appliance date to the user network. Once the home energy manager receives the appliance data (222), the home energy manager can provide the appliance data to the appliance after the appliance has been installed at the premises.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of binding appliance data, comprising:
   receiving, at a server, appliance identification information entered at a terminal, the terminal located at a point of purchase for the appliance;
   identifying appliance data stored at the server used on the appliance identification information;
   binding the appliance data to a home energy manager installed at a premises where the appliance is to be installed;
   receiving one or more inquiries from the home energy manager to determine whether a new appliance has been identified, the one or more inquiries being provided by the home energy manager on a periodic basis; and
   transmitting the appliance data to the home energy manager based at least in part on the one or more inquiries from the home energy manager to determine whether a new appliance has been identified.

2. The method as in claim 1, wherein the method further comprises authenticating communications between the terminal and the server.

3. The method as in claim 1, wherein the method further comprises associating appliance identification information with user data stored at the server.

4. The method as in claim 1, wherein binding appliance data to a home energy manager comprises:
   identifying the home energy manager installed at the premises where the appliance is to be installed;
   identifying a source of the appliance data at the server; and
   providing a path to bind the source of the appliance data at the server with the home ever manager installed at the premises where the appliance is to be installed.

5. The method as in claim 4, wherein the path to bind the source of the appliance data at the server with the home energy manager is provided via a data write to a uniform resource identifier (URI) in a URI tree stored at the server.

6. The method as in claim 4, wherein the home energy manager is identified based at least in part on user data stored at the server.

7. The method as in claim 1, wherein the method further comprises
   receiving, at the home energy manager, an indication that the appliance has been installed; and
   transmitting the appliance data from the home energy manager to the appliance over a network.

8. The method as in claim 1, wherein binding the appliance data to a home energy manager installed at a premises where the appliance is to be installed is initiated prior to installation of the appliance at the premises.

9. A computing system configured to bind appliance data, the computing system comprising a server having one or more processor(s) and a computer-readable medium storing instructions for execution by the processor to cause the processor to perform operations, the operations comprising:
   receiving, at the server, appliance identification information entered at a terminal, the terminal located at a point of purchase for the appliance;
   identifying appliance data stored at the server based on the appliance identification information;
   binding the appliance data to a home energy manager installed at a premises where the appliance is to be installed;
   receiving, at the server, one or more inquiries from the home energy manager to determine whether a new appliance has been identified, the one or more inquiries being provided by the home energy manager on a periodic basis; and
   transmitting the appliance data to the home energy manager based at least in part on the one or more inquiries from the home energy manager to determine whether a new appliance has been identified.

10. The computing system of claim 9, wherein the operations further comprises associating appliance identification information with user data stored at the server.

11. The computing system of claim 9, wherein the operation of binding appliance data to a home energy manager comprises:
    identifying the home energy manager installed at the premises where the appliance is to be installed;

identifying a source of the appliance data in the memory of the computing device; and providing a path to bind the source of the appliance data in the memory of the computing device with the home energy manager installed at the premises where the appliance is to be installed.

12. The computing system as in claim 11, wherein the path to bind the source of the appliance data at the server with the home energy manager is provided via a data write to a uniform resource identifier (URI) in a URI tree stored at the server.

* * * * *